United States Patent
Al-Jabr

(10) Patent No.: US 12,092,613 B2
(45) Date of Patent: Sep. 17, 2024

(54) SMART PLUG FOR FIN FAN TUBES ON-LINE CORROSION MONITORING

(71) Applicant: Saudi Arabian Oil Company, Dhahran (SA)

(72) Inventor: Saad A. Al-Jabr, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 288 days.

(21) Appl. No.: 17/890,631

(22) Filed: Aug. 18, 2022

(65) Prior Publication Data

US 2024/0060937 A1    Feb. 22, 2024

(51) Int. Cl.
| | |
|---|---|
| *F28F 27/00* | (2006.01) |
| *G01N 29/04* | (2006.01) |
| *G01N 29/22* | (2006.01) |
| *G01N 29/24* | (2006.01) |

(52) U.S. Cl.
CPC .......... *G01N 29/223* (2013.01); *F28F 27/00* (2013.01); *G01N 29/04* (2013.01); *G01N 29/2406* (2013.01); *G01N 2291/0234* (2013.01); *G01N 2291/02854* (2013.01)

(58) Field of Classification Search
CPC .. G01N 29/223; G01N 29/04; G01N 29/2406; G01N 2291/0234; G01N 2291/02854; G01N 29/043; G01N 29/07; F28F 27/00
See application file for complete search history.

(56) References Cited

U.S. PATENT DOCUMENTS

| | | | | |
|---|---|---|---|---|
| 4,008,603 A | * | 2/1977 | Paulissen | G01N 29/07 73/901 |
| 4,102,206 A | * | 7/1978 | Perdijon | G01N 29/28 73/644 |
| 4,311,189 A | * | 1/1982 | Robin | F22B 1/063 165/157 |
| 4,391,143 A | * | 7/1983 | Cook | G01N 29/265 310/335 |
| 4,597,294 A | * | 7/1986 | Brill, III | F22B 37/003 376/260 |
| 5,025,215 A | * | 6/1991 | Pirl | G01N 29/225 73/866.5 |
| 5,408,883 A | * | 4/1995 | Clark, Jr. | F22B 37/003 73/643 |

(Continued)

*Primary Examiner* — David J Bolduc
(74) *Attorney, Agent, or Firm* — Bracewell LLP; Constance G. Rhebergen; Eleanor T. Porter

(57) ABSTRACT

A method for measuring corrosion comprising the steps of positioning a smart plug in a plug of a plug sheet of a side plate of a heat exchanger, wherein the smart plug comprises a wireless transmitter and an ultrasonic sensor, wherein the wireless transmitter portion of the smart plug is external to the heat exchanger, wherein the smart plug extends through the side plate such that the ultrasonic sensor contacts a tube positioned in the tube sheet, emitting sound waves from the ultrasonic sensor such that sound waves travel down the tube contacted by the ultrasonic sensor; measuring wall thickness in the tube to produce wall thickness measurement data, wherein the sound waves return to the ultrasonic sensor in the presence of corrosion; and transmitting the wall thickness measurement data from the wireless transmitter of the smart plug.

6 Claims, 1 Drawing Sheet

(56) References Cited

U.S. PATENT DOCUMENTS

| | | | | |
|---|---|---|---|---|
| 5,892,162 | A * | 4/1999 | Spinks | G01S 7/521 |
| | | | | 73/591 |
| 6,138,514 | A * | 10/2000 | Iwamoto | G01N 29/043 |
| | | | | 73/598 |
| RE40,515 | E | 9/2008 | Kwun et al. | |
| 9,903,673 | B1 * | 2/2018 | Dirks | A61L 2/10 |
| 10,962,302 | B2 | 3/2021 | Victor et al. | |
| 2005/0011278 | A1 * | 1/2005 | Brown | G01F 1/666 |
| | | | | 73/861.18 |
| 2007/0006656 | A1 * | 1/2007 | Batzinger | G01N 29/262 |
| | | | | 73/606 |
| 2015/0260686 | A1 * | 9/2015 | Borigo | H04R 15/00 |
| | | | | 324/238 |
| 2017/0138909 | A1 * | 5/2017 | Ostergren | F28F 9/02 |
| 2018/0280917 | A1 | 10/2018 | Victor et al. | |
| 2019/0101342 | A1 * | 4/2019 | Victor | G01M 3/00 |
| 2020/0249204 | A1 * | 8/2020 | Jandhyala | G01N 29/46 |
| 2020/0388410 | A1 * | 12/2020 | Glass, III | G01N 29/041 |
| 2021/0215643 | A1 * | 7/2021 | Kalb | E21B 41/00 |
| 2022/0334582 | A1 * | 10/2022 | Bryner | B62D 57/024 |
| 2023/0298327 | A1 * | 9/2023 | Katayama | G01N 29/11 |
| | | | | 382/145 |

* cited by examiner

SMART PLUG FOR FIN FAN TUBES ON-LINE CORROSION MONITORING

TECHNICAL FIELD

Disclosed are systems and methods for monitoring corrosion. Specifically, disclosed are systems and methods for on-line corrosion monitoring in fin fan tubes by monitoring wall thickness.

BACKGROUND

Fin fan tubes in service are subject to corrosion. There is no option or way to identify the condition of the tubes without taking the fin fan tubes out of service for cleaning and inspection. According to some engineering schedules, the tube bundles are thoroughly inspected only regularly scheduled maintenance cycles which may be as long as seven years. When the tube bundle is in service, no available real time monitoring technique exists to predict or inspect the tube condition.

SUMMARY

Disclosed are systems and methods for monitoring corrosion. Specifically, disclosed are systems and methods for on-line corrosion monitoring in fin fan tubes by monitoring wall thickness.

In a first aspect, a method for measuring corrosion is provided. The method includes the steps of positioning a smart plug in a plug of a plug sheet of a side plate of a heat exchanger. The plug sheet forms an external wall of the side plate and a tube sheet forms an internal wall of the side plate and a space between the plug sheet and the tube sheet is operable to receive a fluid. The smart plug includes a wireless transmitter and an ultrasonic sensor, the wireless transmitter portion of the smart plug is external to the heat exchanger, the smart plug extends through the side plate such that the ultrasonic sensor contacts a tube positioned in the tube sheet. The method further includes the steps of emitting sound waves from the ultrasonic sensor such that sound waves travel down the tube contacted by the ultrasonic sensor, measuring wall thickness in the tube to produce wall thickness measurement data, where the sound waves return to the ultrasonic sensor in the presence of corrosion, and transmitting the wall thickness measurement data from the wireless transmitter of the smart plug.

In certain aspects, the method further includes the step of analyzing the wall thickness measurement data to determine the extent of corrosion in the tube. In certain aspects, the tube is a fin fan tube. In certain aspects, the fluid flows through the tubes.

In a second aspect, a system for measuring corrosion is provided. The system includes a heat exchanger and a smart plug. The heat exchanger includes a plurality of tubes, a tube sheet configured to hold an end of the tubes, a plug sheet positioned on the external face of the heat exchanger, the plug sheet configured to hold a plurality of plugs, and a side plate formed by the tube sheet and the plug sheet. The smart plug includes an ultrasonic sensor, the ultrasonic sensor operable to use sound waves to produce a corrosion measurement data, where the ultrasonic sensor extends through the side plate and contacts one of the tubes, and a wireless transmitter electrically connected to the ultrasonic sensor, the wireless transmitter configured to transmit the corrosion measurement data, where the wireless transmitter is positioned externally to the heat exchanger.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The systems and methods provide real time monitoring of fin fan tubes with the use of a smart plug. More specifically, the systems and methods describe a smart plug for on-line corrosion monitoring installed on the fin fan tube bundles which monitors the internal corrosion and establishes corrosion management and fitness for service program to extend the lifetime of the tube bundles.

Advantageously, the systems and processes described extend the lifetime of heat exchanger tubes. Advantageously, the systems and processes described can reduce or eliminate leaks and other incidents that can lead to loss of product or unplanned equipment shutdown, which can improve operating efficiency and safety and reduce costs. Advantageously, the systems and methods provide proactive monitoring in real time. Advantageously, the systems and processes enable tube inspections without taking fin fan tubes out of service for cleaning. Advantageously, the smart plug of the systems and methods enables real time continuous monitoring of tube wall thickness. Advantageously, the systems and methods directly monitoring the heat exchanger rather than a process condition or aspect of the flow through the heat exchanger.

Figure 1:
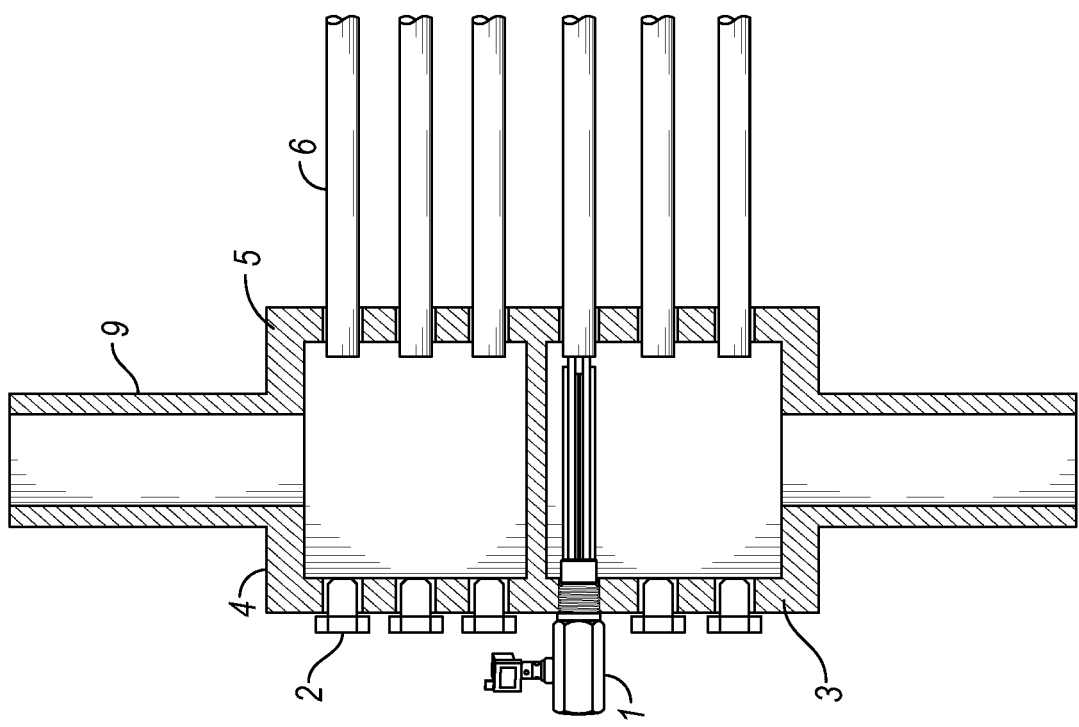
FIG. 1 is a section view of an end of a heat exchanger with a smart plug installed.

Referring to FIG. 1 is a section view of an end of a heat exchanger with a smart plug installed.

Smart plug 1 sits integrated within one of plugs 2 in plug sheet 3 positioned on the external face of side plate 4. Side plate 4 is formed by plug sheet 3 and tube sheet 5. The space between plug sheet 3 and tube sheet 5 allows fluid to move through the heat exchanger through nozzles 9. Tube sheet 5 is configured to hold a plurality of tubes 6 fixed in place. The plurality of tubes can be referred to as a tube bundle. The specific plug 2 selected is based on the desired tube 6 within the tube bundle that is to be monitored and can be based on the total number of tubes, the fluid within the tubes, the fluid surrounding the tube bundle, the operating conditions within the heat exchanger, the material of construction of the tube 6, and combinations of the same. In at least one embodiment, more than one smart plug can be installed in plug sheet 3. Tube 6 can be selected based on the risk of corrosion. In at least one embodiment, tube 6 is a fin fan tube.

Figure 2:
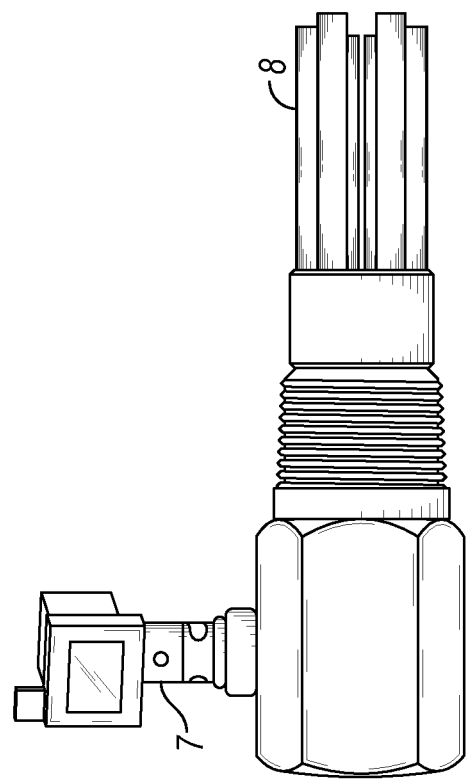
FIG. 2 is a view of a smart plug.

FIG. 2 is a side view of smart plug 1. Smart plug 1 can be any type of probe capable of being integrated into plug 2 that can measure tube wall thickness and transmit the tube wall thickness measurements to a digital control system. In at least one embodiment, smart plug 1 is an electromagnetic acoustic transducer (EMAT) sensor. Advantageously, EMAT sensors can take readings of a material without the need to be in contact with the material. EMAT sensors can advantageously be configured for all waveforms. In at least one embodiment, smart plug 1 includes wireless transmitter 7 and ultrasonic sensor 8. Ultrasonic sensor 8 can utilize guided wave ultrasonic technology. By real time monitoring of heat exchanger tube wall thickness, the use of guided wave ultrasonic technology allows for exchanger tube wall thickness to be determined whereas the conventional method requires equipment shutdown and can't be predicted ahead of time. Wireless transmitter 7 can be any type of transmitter capable of sending an electronic data signal to a remote receiver. Wireless transmitter 7 is configured to send data collected by ultrasonic sensor 8. Smart plug 1 can withstand the pressure in the heat exchanger. Wireless transmitter 7 is connected to ultrasonic sensor 8 by threaded connection.

Ultrasonic sensor 8 of smart plug 1 emits sound waves down the length of tube 6. The sound waves travel down tube 6. The sound waves return to ultrasonic sensor 8 when they contact corrosion and ultrasonic sensor can detect the returning sound waves. Based on the relative size of the returning sound waves, the size and relative location of the corrosion can be measured to produce corrosion measurement data. The corrosion measurement data can be sent from wireless transmitter 7 to a central control system. The corrosion measurement data can be stored for historical purposes or can be compared to stored data or to design specifications and tolerances.

In at least one embodiment, corrosion measurement data transmitted to a controller can be used to determine if the heat exchanger is leaking.

The smart plug measures the corrosion of the physical tube and is in the absence of measuring the fluid flowing through the tube. The smart plug is in the absence of measuring or monitoring the flow rate, pressure, temperature, pH or any other operating condition of the fluid in the tubes of the heat exchanger.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A method for measuring corrosion comprising the steps of:
    positioning a smart plug in a plug of a plug sheet of a side plate of a heat exchanger, wherein the plug sheet forms an external wall of the side plate and a tube sheet forms an internal wall of the side plate and a space between the plug sheet and the tube sheet is operable to receive a fluid, wherein the smart plug comprises a wireless transmitter and an ultrasonic sensor, wherein the wireless transmitter portion of the smart plug is external to the heat exchanger, wherein the smart plug extends through the side plate such that the ultrasonic sensor contacts a tube positioned in the tube sheet,
    emitting sound waves from the ultrasonic sensor such that sound waves travel down the tube contacted by the ultrasonic sensor;
    measuring wall thickness in the tube to produce wall thickness measurement data, wherein the sound waves return to the ultrasonic sensor in the presence of corrosion; and
    transmitting the wall thickness measurement data from the wireless transmitter of the smart plug.

2. The method of claim 1, further comprising the step of analyzing the corrosion measurement data to determine the extent of corrosion in the tube.

3. The method of claim 1, where the tube is a fin fan tube.

4. The method of claim 1, where the fluid flows through the tubes.

5. A system for measuring corrosion comprising:
    a heat exchanger, the heat exchanger comprising:
    a plurality of tubes,
    a tube sheet configured to hold an end of the tubes,
    a plug sheet positioned on the external face of the heat exchanger, the plug sheet configured to hold a plurality of plugs, and
    a side plate formed by the tube sheet and the plug sheet; and
    a smart plug, the smart plug comprising:
    an ultrasonic sensor, the ultrasonic sensor operable to use sound waves to produce a corrosion measurement data, wherein the ultrasonic sensor extends through the side plate and contacts one of the tubes, and
    a wireless transmitter electrically connected to the ultrasonic sensor, the wireless transmitter configured to transmit the corrosion measurement data, wherein the wireless transmitter is positioned externally to the heat exchanger.

6. The system of claim 5, wherein the plurality of tubes are fin fan tubes.

* * * * *